United States Patent [19]

Graese

[11] Patent Number: 5,058,750

[45] Date of Patent: Oct. 22, 1991

[54] PLANT FOR THE SORTING OF SUSPENDED ARTICLES AND THE USE HEREOF

[76] Inventor: Steen S. Graese, Søborg, Denmark

[73] Assignee: Dansk Vaskeri Teknik A/S, Herley, Denmark

[21] Appl. No.: 460,369

[22] Filed: Jan. 3, 1990

[30] Foreign Application Priority Data

Jan. 4, 1989 [DK] Denmark ................................. 25/89

[51] Int. Cl.$^5$ ........................ B07C 3/10; B05G 47/49
[52] U.S. Cl. ................................ 209/583; 198/465.4; 209/569; 209/937
[58] Field of Search ................. 209/583, 937, 33, 569, 209/539; 198/465.4, 680, 349.95

[56] References Cited

U.S. PATENT DOCUMENTS

| | | | |
|---|---|---|---|
| 4,114,538 | 9/1978 | Nicodemus, Jr. et al. | 198/680 X |
| 4,239,435 | 12/1980 | Weiss et al. | 209/937 X |
| 4,343,503 | 12/1981 | de Mimerand | 209/3.3 |
| 4,875,416 | 10/1989 | Duce | 198/465.4 X |
| 4,903,819 | 2/1990 | Heinhold et al. | 198/465.4 |
| 4,907,699 | 3/1990 | Butcher et al. | 209/3.3 |

FOREIGN PATENT DOCUMENTS 2164909  4/1986  United Kingdom ........... 198/349.95

Primary Examiner—Donald T. Hajec
Attorney, Agent, or Firm—Antonelli, Terry, Stout & Kraus

[57] ABSTRACT

A plant for the sorting of suspended articles (a, b, ... z), e.g. hanger-suspended clothing (10), where each article is provided with an identification, which at a lead-in conveyor (12) is introduced into the plant's electronic control system (14, 15, 16, 19) by a scanning element (17), comprises a number of sorting section (1, 2, 3, ... n) coupled in series and each comprising at least one conveyor and at least one intermediate store parallel herewith. In front of each sorting section there is provided a switchpoint, and each section is provided with stop elements, scanning elements for the passage of articles and separator elements. All of the elements are controlled and scanned by a programmable electronic control system (14, 15, 16, 19).

9 Claims, 3 Drawing Sheets

PLANT FOR THE SORTING OF SUSPENDED ARTICLES AND THE USE HEREOF

FIELD OF THE INVENTION

The present invention relates to a plant for the sorting of suspended articles such as, for example, clothing on hangers, where each article or suspension element for each article is provided with an identification arranged to be introduced into an electronic control system in the plant with such identification preferably taking place.

Such plants are used, for example, for the sorting of hanger-suspended clothing from a laundry or a drycleaners, where very large numbers of articles of clothing are washed or cleaned, hung on hangers and possibly dried and ironed, after which the articles of clothing have to be sorted out for a number of different users. In many cases, the clothing for each user, or for some of the users, is also further sorted so that the users receive their clothing arranged in a certain sequence.

The sorting, for example out of regard for the delivery of the washed or cleaned clothing, can be effected in accordance with the customers' geographical location, and in many cases there are used different sorting criteria on different days of the week, whereby such sorting plants become complicated and very extensive. Some known plants are based on all the clothing being suspended on hangers on a ring track in a conveyor system, and the sorting is effected by gathering manually or automatically at one or several places along the ring track. Therefore, such systems become very extensive and costly, in that the sorting can normally be commenced only after all of the hanger-suspended clothing has been introduced on to the ring track. Other known plants are able to effect a single sorting automatically, so that the articles are sorted out for a number of users, but without any sorting taking place of each user's articles. Such plants require at least one track switching point per user and only a partial sorting is achieved.

SUMMARY OF THE INVENTION

The object of the invention is to provide a plant for the sorting of suspended articles, e.g. clothing on hangers, configured in such a way that it does not occupy much space and arranged in such a manner that the sorting is effected quickly, fully automatically and precisely.

The above object of the present invention may be achieved by providing a plant which includes a plurality of sorting stations which are coupled in series, with each section comprising at least one conveyor and at least one intermediate storage parallel thereto. A front of each sorting section is provided with a track switch point, and each section is provided with stop elements, scanning elements for the passage of suspended articles as well as separation elements. Each of the elements are controlled and scanned by a programmable electronic control system.

It is herewith possible to sort a number of suspended articles directly, gradually as they are led into the sorting plant, if they are marked so that each article of clothing can be identified, and if the electronic control system is suitably programmed for this purpose. The introduction of the identification of each article into the plant can be effected in different ways, depending on the size of the plant and its degree of automation. The identification can be entered via a keypad when an article passes an operator at the lead-in conveyor, or a hand-operated or fully-automatic reading device can be used for an identification placed on the article or on the suspension element. The sorting is carried out quickly for the reason that the articles need only to be run through the plant one time, after which all of the articles are arranged in the order which has been determined by the electronic control system.

The plant according to the invention becomes particularly simple, and the electronic control system and its associated programs are simplified considerably each sorting section includes one conveyor and one intermediate store.

The plant according to the invention becomes even more simple the conveyor and the intermediate store each include their own slide bar which is fashioned preferably, of a stainless steel, aluminum or chrome or nickel plated iron possibly coated with a friction reducing agent and disposed in a slightly inclined manner. The whole of that part of the plant in which the sorting takes place requires no mechanical forward conveying, in that it is based on gravitation. The control is simplified considerably, in that all that is required is only to stop, release and separate the suspended articles and to switch the tracks, all of which is effected automatically by the programme-controlled control system. The space requirements can be limited because the plant can be arranged so that all of the articles can be led through the sorting without substantial changes of direction, for example so that the clothing suspended on the hangers does not need to be redirected during the sorting. Furthermore, this results in quicker sorting, in that the articles can be led through the plant immediately after one another.

To achieve an optimum simplification and reduce the number of intermediate stores, in accordance with further features of the present invention, the conveyor or conveyors in the last sorting section may also be used as intermediate stores.

Advantageously, according to the present invention, the plant is arranged to effect a sorting in two stages, with the first stage comprising the conveyance of all of the suspended articles to be sorted to the intermediate stores, and with the second stage comprising the conveyance of all of the articles from the intermediate store to the conveyor or conveyors and the intermediate store or stores in the last sorting section in a predetermined sequence, with all the control being effected by the electronic control system. From the purely practical point of view, it is not noticed that the sorting is effected in two stages, in that the plant changes continuously from the first to the second sorting sequence when all of the articles have been introduced into the sorting plant. In this manner, the sorting is optimized and the necessary time consumption is reduced.

The electronic control system for the plant according to the invention is preferably arranged so that at least one computer may communicate with a data base, and at least one further computer may be arranged to communicate with the first computer and to control and scan all of the sorting sections by electronic circuits with the computers being placed in a vicinity of or on the sorting plant. The database can be fed with information in the form of tables etc., covering the identification the articles have been assigned. Information concerning the customers' geographical location, the days or dates on which their cleaned clothing is to be delivered, and information concerning whether or not their clothing is to be sorted in a special manner etc., is also fed into the control system. The electronic control system's computer retrieves the necessary data from the database as required, and generates daily programs or other programs which are transferred to the actual machine control, which hereafter controls the plant.

The plant according to the invention can be based on an optical reading of line-codes on the articles or the suspension elements by providing an apparatus for optical and/or electronic scanning of the articles on the lead-conveyor by registration of a code on the article or the suspension element. It will be obvious to those familiar with the art that it will also be able to be arranged for the scanning of other forms of codes placed on the articles or on the suspension elements.

If the plant according to the invention includes, for example, a scanning apparatus such as an optical and/or electronic reading device at the outlet conveyor, the possibility is provided for a post-checking of the sorted articles, thus providing complete security that the articles on the outlet conveyor are arranged in the desired order. If, for some reason or another, this should not be the case, the plant can be arranged so that it writes out an error report or, if sorting errors of a larger extent have occurred, all of the articles are returned to the inlet conveyor for resorting.

The plant according to the invention has been developed and arranged mainly for the sorting of hanger-suspended clothing, where the clothing comprises articles from a laundry or washed clothing. It is characteristic of such items that at intervals they return to the plant for sorting, in that, e.g. an overall or similar item of working clothes often has a lifetime of 100-200 washes. It is also characteristic for the washed clothing to be retained in one of the intermediate stores for only a short period of time before the conclusion of the sorting. Consequently, what is involved is not the normal intermediate storing of semi- or fully-manufactured items. However, it will be obvious to those familiar with the art that a plant of this kind can be used for the sorting of any form of suspended article, e.g. in a production concern, a processing concern, an abattoir etc.

BRIEF DESCRIPTION OF THE DRAWINGS

The invention will now be described in more detail with reference to the drawing, in that FIG. 1 shows a plant according to a preferred embodiment.

DETAILED DESCRIPTION

Figure 1:
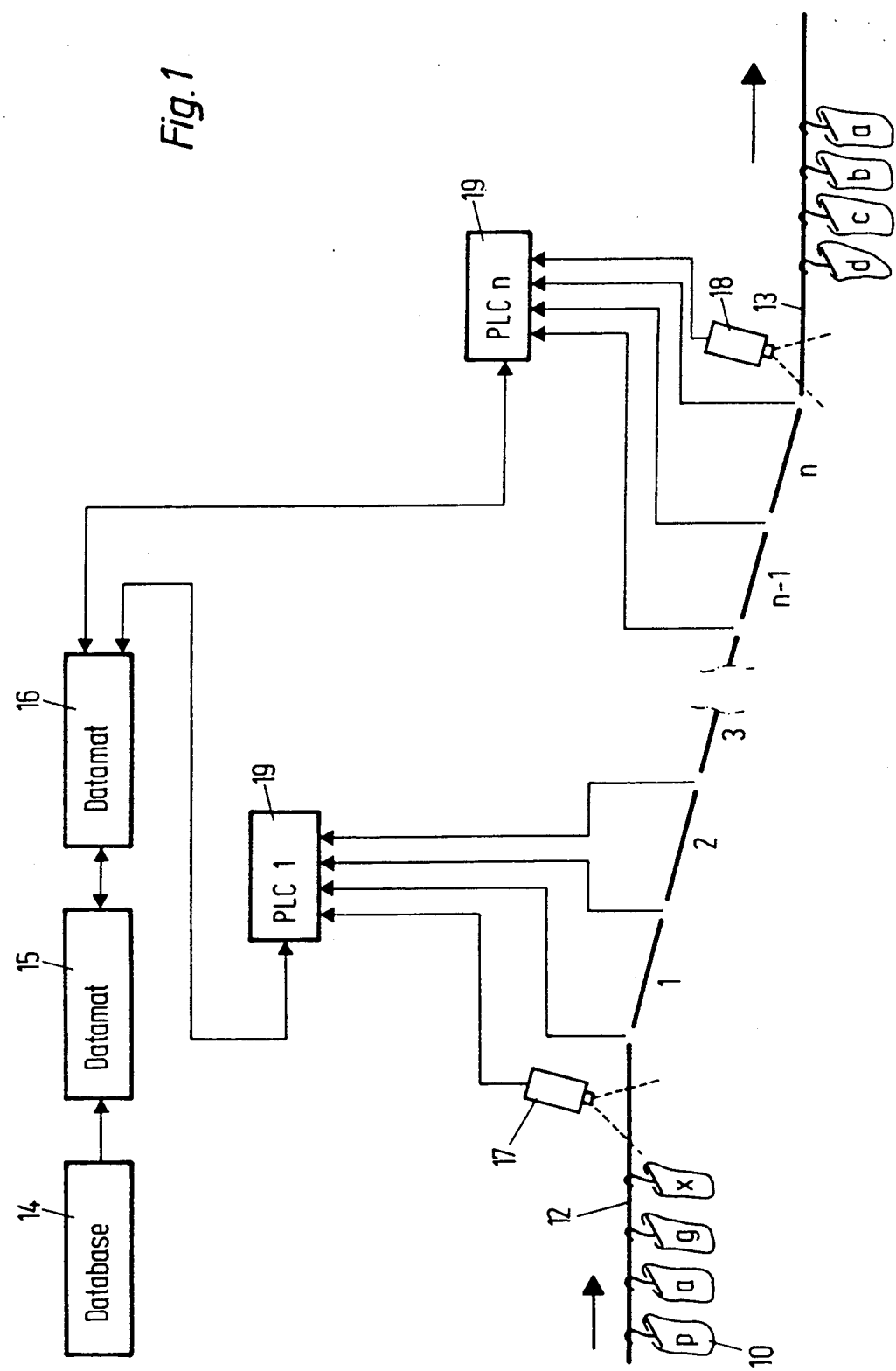

In FIG. 1 a sorting plant according to the invention, comprise a lead-in conveyor 12 with unsorted hanger-suspended clothing 10, a plurality of sorting sections 1-n and an outlet conveyor 13 for sorted clothing 11, in that all of the sorting sections are arranged in series.

The unsorted hanger-suspended clothing 10 is carried by a conveyor, e.g. a horizontal screw-conveyor 12, past a registration device 17 where, e.g., a camera scans a code, e.g. a line-code, on the clothing or on the hanger, and into the first sorting section 1. From here, the clothing is carried through the subsequent sorting sections and led away by means of an outlet conveyor 13, which may also be a horizontal screw-conveyor.

The clothing is now sorted in the correct order, see designations on the articles of clothing. For a possible post-checking of the sorting, a scanning device 18 for the identification of the articles can be placed at the outlet conveyor 13.

The sorting sections 1, 2 ... n comprise inclined slide bars so that all transport through the sorting parts of the sorting plant is based on gravitation. The slide bars are made of stainless steel, aluminium or chromed or nickel-plated iron, and can be coated with a friction-reducing agent or provided with one or more slide profiles of synthetic material such as Teflon (R) or the like.

Depending on the size of the plant, the sorting sections are controlled by one or more electronic circuits 19, each of which comprises a PLC, possibly connected to a computer, and input and output circuits which are coupled to the scanning devices 17 and 18, to the sorting sections 1, 2, ... n and to the driving aggregates for the conveyors 12 and 13.

The plant according to the invention also comprises a computer 15 which is coupled to a database 14 in which the production programs are generated, e.g. for one day, in that the actual data are retrieved from the database. When it is required, a daily program consisting of a number of codes, for example a number of line codes in the desired sequence, can be transferred to the machine control which, for example, comprises a further computer 16 which handles the amount of data for the day. The relevant data are collected and sent further to the actual machine control, which comprises one or more electronic circuits 19 coupled directly to the plant and placed on or in the vicinity thereof. These electronic circuits control the inputs to and outputs from the plant itself, and ensure that the whole of the sorting is effected in the manner as prescribed in the database and in the daily programs for each customer with regard to the sequence of the articles, their size, colour, number and so on. The principle of the actual sorting and the sorting method is described in more detail later with reference to FIGS. 2 and 3.

The principle of the sorting itself is first explained with reference to FIG. 2, which shows an embodiment of the sorting plant in which each sorting section has one conveyor and, parallel herewith, one intermediate store per conveyor.

Figure 2:
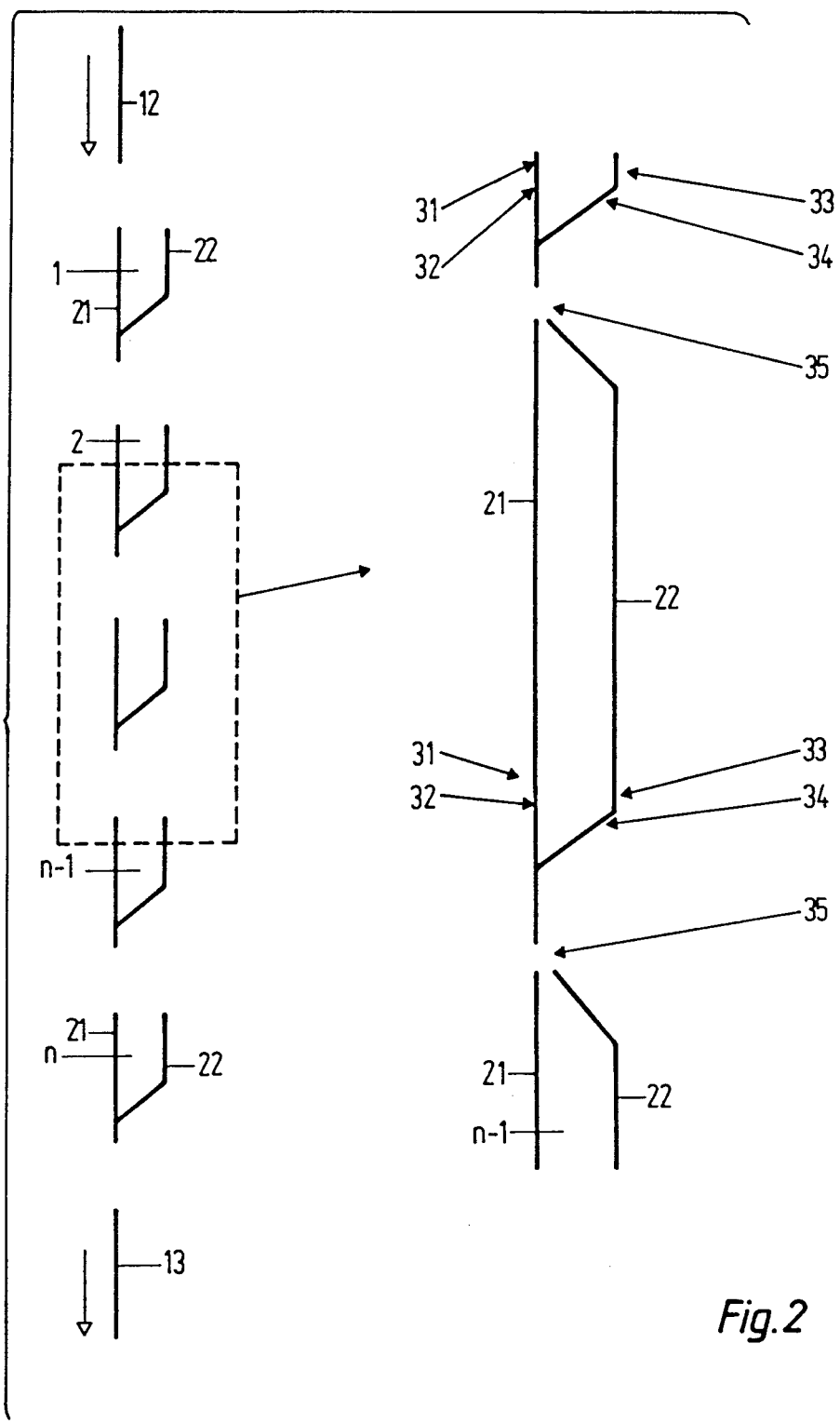
FIG. 2 shows in more detail how the sorting plant in FIG. 1 is arranged in principle.

In FIG. 2 is seen a number of sorting sections 1, 2, 3, ... n coupled in series between a lead-in conveyor 12 and an outlet conveyor 13.

Each section comprises a conveyor or a conveyor part 21 and an intermediate store 22. At the lead-in to each section there is a track switchpoint 35, so that the hangers from a section lying in front are either carried to the conveyor or the conveyor part 21 or to the intermediate store 22, depending on the position of the switching point 35. Foremost in the sliding direction, the intermediate store 22 is coupled to the conveyor so that the hangers from the store can be fed back onto the outlet of the conveyor or the conveyor part 21. All hangers on the intermediate store 22 are however, held back by a separator 33 which is arranged to release the hangers one at a time when this is commanded by the electronic control system. After the separator 33 there is disposed a detector or sensor 34 which detects the passing-by of each hanger. The conveyor 21 is provided with a stop element 31 and possibly a separator and a sensor or detector 32 which detects the passing-by of each hanger.

All of the parts 21, 22, 31, 32, 33, 34, 35 are commonly known parts for conveying plants for hangers, hooks or similar suspension elements. The electronic circuits 19 (see FIG. 1) control and scan all the parts on the sorting sections controlled by the computer 16. The electronic control circuit can also be arranged to receive position signals from the mechanically-movable parts, so that it always knows in which position a switchpoint is standing, whether a stop element has been activated or not, and whether or not a separator is operating.

Figure 3:
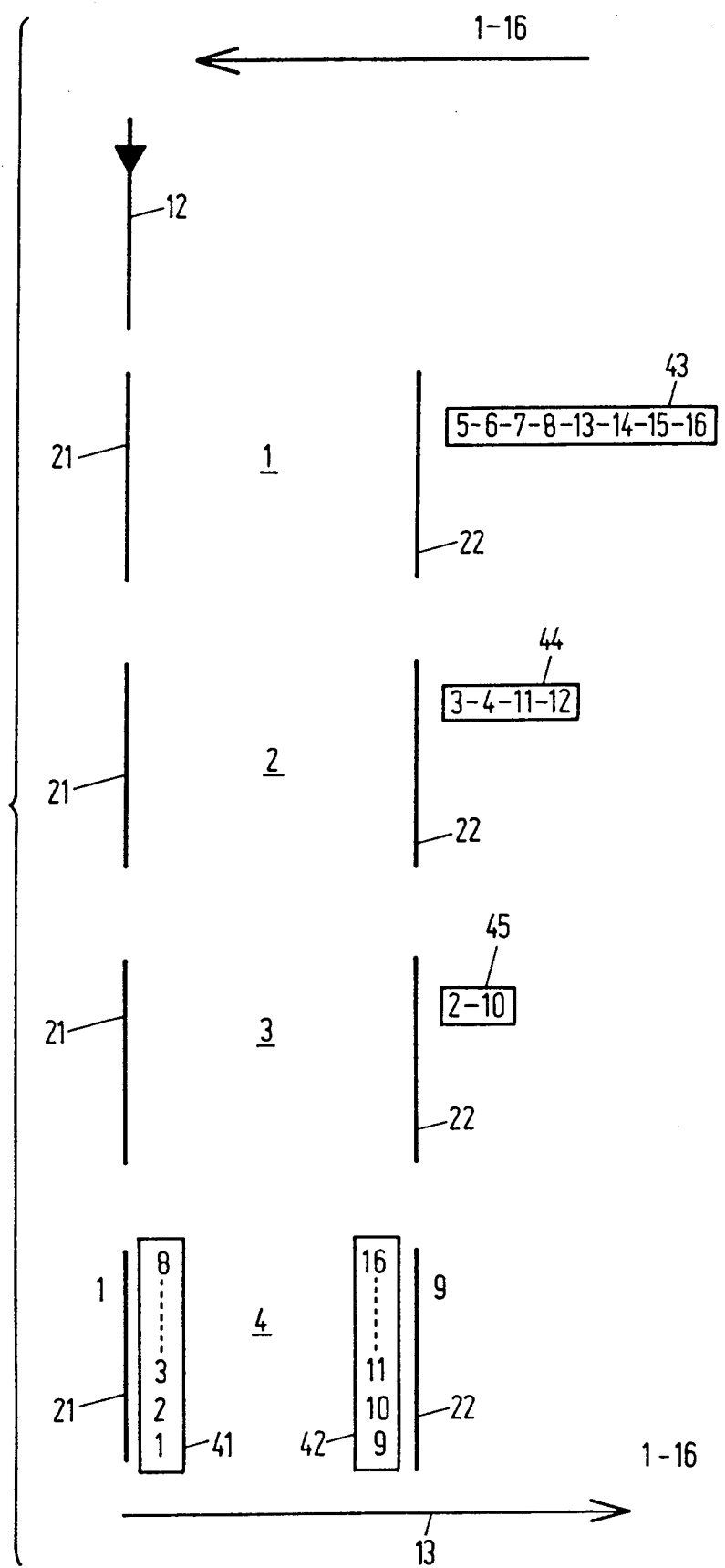
FIG. 3 shows an embodiment of a sorting plant, arranged for the sorting of up to sixteen articles.

FIG. 3 shows the principle of a plant according to the invention arranged for the sorting of up to sixteen articles during the use of four sorting sections 1, 2, 3 and 4.

Each time a further sorting section is added, the number of articles which can be sorted is doubled. If, for example, ten sorting sections are used, the sorting capacity will be $2^{10}$ articles, i.e. 1024 articles, and if twelve sorting sections are used, the sorting capacity will be $2^{12}$, i.e. 4096 articles at one time and with one run through the plant.

In FIG. 3, all sixteen incoming articles are led via the lead-in conveyor 12 to the 1st sorting section. All of the articles which are required to be sorted out on the outlet conveyor 13 as articles with the numbers 5, 6, 7, 8, 13, 14, 15, 16 are led into the intermediate store 22 and comprise the group 43. These eight articles can and will also presumably be in random order. Those articles which are desired out on the outlet conveyor 13 as articles 3, 4, 11, 12 are led via the conveyor 21 of sorting section 1 to the intermediate store 22 in sorting section 2 and comprise the group 44, where the individual articles can naturally be arranged in random order. Those articles which are desired to be sorted out as articles nos. 2 or 10 are led further by the conveyors to the intermediate store 22 of sorting section 3, and comprise the group 45 in random order. Those articles which are desired to be sorted as article no. 1 and article no. 9 are led all the way forward to sorting section 4, and in such a way that article no. 1 is led onto the conveyor 21 and article no. 9 in the intermediate store 22.

All of the articles which are required to be sorted have now been brought into the sorting plant, and the 1st sorting sequence has been concluded. The electronic control system then ensures that the articles in the intermediate stores in sorting sections 1, 2 and 3 are now led down to sorting section 4 in the correct order, so that the first eight articles are placed in the correct sequence on the conveyor 21 and comprise the group 41, while the subsequent articles 9-16 are placed in the intermediate store 22 and comprise the group 42. Hereafter, sorting section 4 is emptied by first emptying the conveyor 21, and then emptying the intermediate store 22, so that all of the articles are led away in the correct sequence 1-16 by the outlet conveyor 13.

When a larger or a smaller number of sorting sections are used, the sorting is established in two stages in a completely corresponding manner.

It will be obvious to those familiar with the art that the shorting can also be effected if each sorting section has more than one conveyor 21 or more than one intermediate store 22, provided that suitable track switch point functions are established.

I claim:

1. Plant for sorting of articles suspended from a hanger at least one of the articles or the hanger is provided with an identification, said suspended articles being introduced into a programmable electronic control system in the plant through a lead in conveyor means, the plant comprising:
   a plurality of individual sorting sections connected in series, with each sorting section including at least one conveyor and at least one intermediate store disposed in parallel with the respective sorting sections,
   a track switchpoint provided at a forward end of each of said individual sorting sections for enabling a selective switching of the suspended articles to a further sorting section or an intermediate store,
   wherein each section is provided with stop elements, scanning elements through which the suspended articles are passed, and separation elements, and
   wherein said stop elements and said separation elements are controlled by the programmable electronic control system in response to a scanning of the identification by said scanning elements.

2. Plant according to claim 1, wherein each individual sorting section includes only one conveyor and one intermediate store.

3. Plant according to claim 1, wherein the at least one conveyor and the at least one intermediate store of each individual sorting section includes a slide bar formed of at least one of stainless steel, aluminum, chromed or nickel-plated iron and wherein each slide bar is disposed in a slightly inclined manner so as to convey the suspended articles by gravity.

4. Plant according to one of the claims 2 or 3, wherein the at least one conveyor in the last sorting section of said plurality of individual sorting sections is used as an intermediate store.

5. Plant according to claim 1, wherein each of the individual sorting sections includes at least one conveyor and at least one intermediate store, and wherein said programmable electronic control system is adapted to effect sorting of the suspended articles in two stages, wherein in a first of said two stages all of the suspended articles to be sorted are conveyed from the individual sorting sections to the intermediate store associated therewith, and in a second of said two stages all of the articles from the respective intermediate stores of the respective individual sorting sections are conveyed to the at least one conveyor and the at least one intermediate store in the last individual sorting section of said plurality of individual sorting sections in a predetermined sequence determined by the electronic control system.

6. Plant according to one of claims 1 or 5, wherein the electronic control system comprises at least one first computer means in communication with a data base, and at least one further computer means in communication with the at least one first computer means for controlling and scanning all of the individual sorting sections by electronic circuit means.

7. Plant according to claim 1, wherein said scanning elements include at least one of optical and electronic scanning means for scanning the identification on the articles on the lead-in conveyor means or the hanger.

8. Plant according to one of claims 1 or 7, further comprising one of an optical and electronic scanning means provided at an outlet conveyor means provided downstream of the last individual sorting section.

9. Plant according to claim 3, wherein each slide bar is coated with a friction-reducing agent.

* * * * *